(12) United States Patent
Karlsson et al.

(10) Patent No.: US 9,518,477 B2
(45) Date of Patent: Dec. 13, 2016

(54) COOLING DEVICE FOR ELECTRIC MOTOR

(75) Inventors: Pontus Karlsson, Bromma (SE);
Viktor Lassila, Arnäsvall (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 141 days.

(21) Appl. No.: 13/698,976

(22) PCT Filed: May 18, 2011

(86) PCT No.: PCT/SE2011/050625
§ 371 (c)(1),
(2), (4) Date: Jan. 23, 2013

(87) PCT Pub. No.: WO2011/146005
PCT Pub. Date: Nov. 24, 2011

(65) Prior Publication Data
US 2013/0209239 A1      Aug. 15, 2013

(30) Foreign Application Priority Data

May 21, 2010    (SE) ...................................... 1050508

(51) Int. Cl.
*H02K 9/19*     (2006.01)
*F01D 25/12*    (2006.01)
(Continued)

(52) U.S. Cl.
CPC .................. *F01D 25/12* (2013.01); *H02K 5/20* (2013.01); *H02K 9/06* (2013.01); *H02K 9/08* (2013.01); *H02K 9/19* (2013.01)

(58) Field of Classification Search
CPC .............. H02K 9/06; H02K 9/08; H02K 9/19; F01D 25/12
(Continued)

(56) References Cited

U.S. PATENT DOCUMENTS 3,045,132 A      7/1962  Yeoman
4,739,204 A *    4/1988  Kitamura et al. .......... 310/68 D
(Continued)

FOREIGN PATENT DOCUMENTS

CN       1057552 A       1/1992
CN       2674748 Y       1/2005
(Continued)

OTHER PUBLICATIONS

International Search Report and Written Opinion received for PCT Patent Application No. PCT/SE2011/050625, mailed on Jul. 22, 2011, 11 pages.
(Continued)

*Primary Examiner* — Terrance Kenerly
*Assistant Examiner* — Rashad Johnson
(74) *Attorney, Agent, or Firm* — Morrison & Foerster LLP

(57) ABSTRACT

A device for cooling of electric motor, which has a stator with a jacket surface/stator back, wherein a housing is arranged to surround the stator, includes at least one cooling channel in which a liquid cooling medium streams for cooling of the electric motor, wherein the housing is arranged to run separated from the stator along a main part of the thermoset cased jacket surface of the stator for forming of said cooling channel between the housing and said jacket surface, wherein the stator winding of the stator is arranged to run along and axially project from and turn outside of said jacket surface, wherein the stator including the projecting stator winding is embedded with said thermoset, wherein said cooling channel also is formed between the housing and the thus projecting stator winding.

9 Claims, 2 Drawing Sheets

(51) Int. Cl.
*H02K 5/20* (2006.01)
*H02K 9/08* (2006.01)
*H02K 9/06* (2006.01)

(58) Field of Classification Search
USPC .................................. 310/54, 58; 415/117
See application file for complete search history.

(56) References Cited

U.S. PATENT DOCUMENTS

| | | | | |
|---|---|---|---|---|
| 4,870,307 A * | 9/1989 | Kitamura et al. | ............... | 310/54 |
| 4,874,972 A * | 10/1989 | Bansal et al. | ................ | 310/57 |
| 5,220,233 A * | 6/1993 | Birch et al. | ............. | 310/156.28 |
| 6,445,095 B1 * | 9/2002 | Liang et al. | .................... | 310/64 |
| 6,617,716 B2 * | 9/2003 | Ishida | .................... | H02K 1/185 |
| | | | | 310/54 |
| 6,731,028 B2 * | 5/2004 | Derleth et al. | ................... | 310/52 |
| 6,787,949 B2 * | 9/2004 | Bostwick et al. | ............. | 310/59 |
| 6,800,971 B1 | 10/2004 | Mangold et al. | | |
| 7,009,317 B2 * | 3/2006 | Cronin | .................... | H02K 9/19 |
| | | | | 310/52 |
| 7,224,094 B2 * | 5/2007 | Shimada | .................. | B23Q 1/70 |
| | | | | 310/58 |
| 2003/0164650 A1 * | 9/2003 | Yockey | .................... | H02K 5/20 |
| | | | | 310/58 |
| 2007/0273219 A1 * | 11/2007 | Shimada | .................. | B23Q 1/70 |
| | | | | 310/52 |
| 2009/0026857 A1 * | 1/2009 | Lavall | ...................... | H02K 5/20 |
| | | | | 310/58 |
| 2009/0243446 A1 * | 10/2009 | Platen | ...................... | H02K 5/20 |
| | | | | 312/236 |
| 2010/0001597 A1 * | 1/2010 | Noll | ......................... | H02K 5/20 |
| | | | | 310/58 |
| 2011/0074233 A1 * | 3/2011 | Okada | ...................... | H02K 1/32 |
| | | | | 310/54 |
| 2014/0111043 A1 * | 4/2014 | Knappenberger | ........ | H02K 5/04 |
| | | | | 310/65 |
| 2014/0117796 A1 * | 5/2014 | Kassler | ..................... | H02K 9/19 |
| | | | | 310/54 |
| 2014/0246932 A1 * | 9/2014 | Chamberlin | ............... | H02K 9/19 |
| | | | | 310/54 |
| 2015/0207378 A1 * | 7/2015 | Buttner | ..................... | H02K 5/20 |
| | | | | 310/54 |
| 2015/0214810 A1 * | 7/2015 | Buttner | ..................... | H02K 5/20 |
| | | | | 310/54 |

FOREIGN PATENT DOCUMENTS

| | | |
|---|---|---|
| DE | 10122425 A1 | 11/2002 |
| EP | 0434845 A1 | 7/1991 |
| EP | 0461906 A2 | 12/1991 |
| JP | 2-139462 U | 11/1990 |

OTHER PUBLICATIONS

Australian Office Action received for Australian Patent Application No. 2011256862, issued on Apr. 22, 2014, 3 pages.
Office Action received for Chinese Patent Application No. 201180025336.8, mailed on Sep. 18, 2014, 17 pages (10 pages of English Translation and 7 pages of Official Copy).
Office Action received for Chinese Patent Application No. 201180025336.8, mailed on May 7, 2015, 9 pages (4 pages of English Translation and 5 pages of Official Copy).
Office Action received for Chinese Patent Application No. 201180025336.8, mailed on Dec. 25, 2015, 16 pages (8 pages of English Translation and 8 pages of Official Copy).
Office Action received for Chinese Patent Application No. 2011800253368, mailed on May 9, 2016, 13 pages (7 pages of English Translation and 6 pages of Official Copy).

* cited by examiner

COOLING DEVICE FOR ELECTRIC MOTOR

CROSS REFERENCE TO RELATED APPLICATIONS

This is a U.S. National Phase patent application of PCT/SE2011/050625, filed May 18, 2011, which claims priority to the Swedish Patent Application No. 1050508-9, filed May 21, 2010, each of which is hereby incorporated by reference in the present disclosure in its entirety.

TECHNICAL FIELD

The invention relates to a cooling device for electric motor according to the preamble of claim 1. The invention also relates to an electric motor. The invention also relates to a motor vehicle.

BACKGROUND ART

During drive electric motors are heated whereby cooling is required in order to divert the heat. Cooling of electric motor may be effected by means of different types of cooling media such as e.g. air, water or oil.

U.S. Pat. No. 6,800,971 B1 discloses a device for liquid cooling of a stator for a start motor. The stator has a cooing channel formed between a housing surrounding the stator and a synthetic resin coated jacket surface of the stator back of the stator, wherein cooing is intended to be effected by means of a liquid cooling medium arranged to stream in the cooling channel such that cooling is effected directly towards the synthetic resin coated jacket surface of the stator back. The device has metal end plates welded at the respective end of the stator back.

EP 0434845 A1 discloses a device for liquid cooling of a stator. The core of the stator bears against a jacket provided with cooling channels in which liquid is arranged to stream. At the end of the stator core sealing rings are arranged. An adhesive having a sealing function exists between the stator laminates.

A problem with certain high performance electric motors is that the winding temperature becomes too high which may lead to damages on the electric motor, and for protecting the electric motor the current needs to be reduced wherein performance of the electric motor is impaired.

Further it is difficult to provide good contact between the stator of the electric motor and cooling portions resulting in a substantially impaired heat transfer and thereby impaired performance due to undesired temperature increase of the stator.

OBJECT OF THE INVENTION

An additional object of the present invention is to provide a cooling device for an electric motor which facilitates efficient cooling, compact design of an electric motor, and cost efficient construction.

SUMMARY OF THE INVENTION

These and other objects, apparent from the following description, are achieved by means of a cooling device for electric motor, electric motor and a motor vehicle, which are of the type stated by way of introduction and which in addition exhibits the features recited in the characterising clause of the appended claims 1, 9 and 10. Preferred embodiments of the cooling device are defined in appended dependent claims 2-8.

According to the invention the object is achieved with a device for cooling of electric motor, which electric motor comprises a stator with a jacket surface/stator back cased with a heat conducting thermoset, wherein a housing is arranged to surround the stator, wherein the device comprises at least one cooling channel in which a liquid cooling medium is intended to stream for cooling of the electric motor, wherein the housing is arranged to run separated from the stator along a main part of the thermoset cased jacket surface of the stator for forming of said cooling channel between the housing and said jacket surface, wherein the stator winding of the stator is arranged to run along and axially project from and turn outside of said jacket surface, wherein the stator including the projecting stator winding is embedded with said thermoset, wherein said cooling channel also is formed between the housing and the thus projecting stator winding. Hereby the cooling medium comes in direct contact with the thermoset cased stator and cooling by means of the liquid medium is effected directly towards the thermoset embedded coil ends, which results in the fact that efficient cooling of the thermoset embedded is facilitated. This results in that a temperature transition from the winding with the coil ends via the thermoset to the cooling medium is required for diversion of the heat from the winding, wherein consequently efficient cooling is obtained. Direct cooling is consequently effected on the coil ends where it is hottest and where local points being hotter the surrounding area, so called hotspots, arise, wherein efficient cooling is effected where it is hottest. Hereby it may be avoided that, with maintained performance, the winding temperature becomes too high and damages on the electric motor occur.

By cooling directly on the heat conducting thermoset good thermal contact between stator winding/coil ends and the liquid cooling medium is guaranteed. Further is facilitated, due to the efficient cooling, reduction of the radial extension of the cooling channel with maintained cooling effect and consequently reduction of the radius of the electric motor including housing and thus obtaining a more compact electric motor unit making space available during installation in a vehicle. Due to the fact that the housing is arranged to run separated along a greater part of the thermoset cased stator the electric motor may be formed as a so called frameless motor, i.e. an electric motor without housing, wherein the electric motor is connected to a housing for forming of cooling channel. Hereby an electric motor with a stator embedded in said thermoset and rotor with fixed interface to rotor shaft may be manufactured separately by a supplier while the housing may be formed in the vehicle which results in reduced costs for procurement and installation of electric motor and consequently reduced costs in the overall production of the vehicle.

According to an embodiment of the device said thermoset is constituted by a heat conducting epoxy. Epoxy with such properties as liquid tight, heat conducting, curing, heat sustainable and adhesive constitutes an excellent thermoset for this purpose. Heat conducting epoxy has good thermal conductivity and thereby efficiently transports heat from the coil ends of electric motor to the housing which is arranged to support the stator of the electric motor. The housing is then arranged to be cooled with a suitable cooling medium such as air, water, oil or other suitable cooling medium. Further the epoxy also levels out the temperatures on different locations in the winding.

According to an embodiment of the device said liquid cooling medium is constituted essentially by water. With water as a liquid cooling medium a very good cooling is obtained.

According to an embodiment of the device the housing is sealingly connected by means of sealing means to said thermoset at the respective end area of the stator. Hereby leakage of the liquid cooling medium is avoided.

According to an embodiment of the device said liquid cooling medium is arranged to stream essentially axially in said cooling channel.

According to an embodiment the device comprises support elements arranged to run axially between the housing and the thermoset cased stator forming axial cooling portions of said cooling channel. Hereby is avoided that the housing bends and in that way reduces the space of the cooling channel. Further control of the cooling medium is obtained by the distribution of the cooling medium in cooling channel portions.

According to an embodiment of the device said liquid medium is arranged to stream essentially circumferentially in said cooling channel.

According to an embodiment the device comprises support elements arranged to run circumferentially between the housing and the thermoset cased stator forming circumferentially extending cooling channel portions of said cooling channel. Hereby is avoided that the housing bends and in that way the cooling channel space is reduced. Further, control of the cooling medium is obtained through the distribution of the cooling medium.

DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION OF EMBODIMENTS

Figure 1:
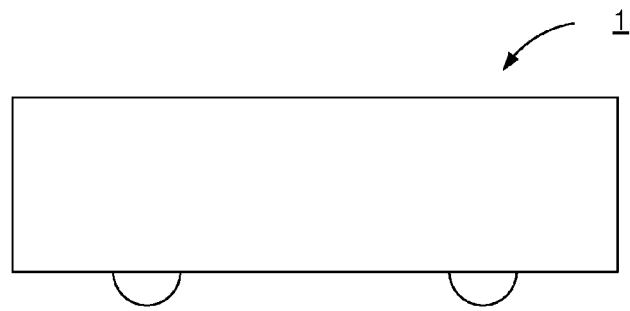
FIG. 1 schematically shows a side view of a motor vehicle.

With reference to FIG. 1, a side view of a motor vehicle 1 is shown. The vehicle may be a heavy vehicle, such as a construction vehicle or a military vehicle. The vehicle may be a wheeled vehicle or a tracked vehicle. The vehicle may alternatively be a car. The vehicle 1 comprises at least one electric motor comprising a device for cooling of electric motor according to any of the embodiments below.

Figure 2:
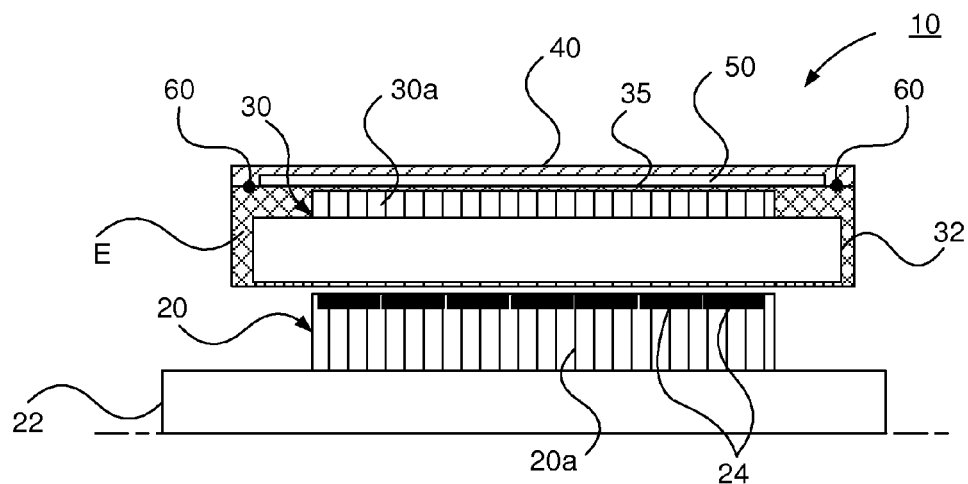
FIG. 2 schematically shows an axial cross sectional view of an electric motor according to an embodiment of the present invention.
Figure 3A:
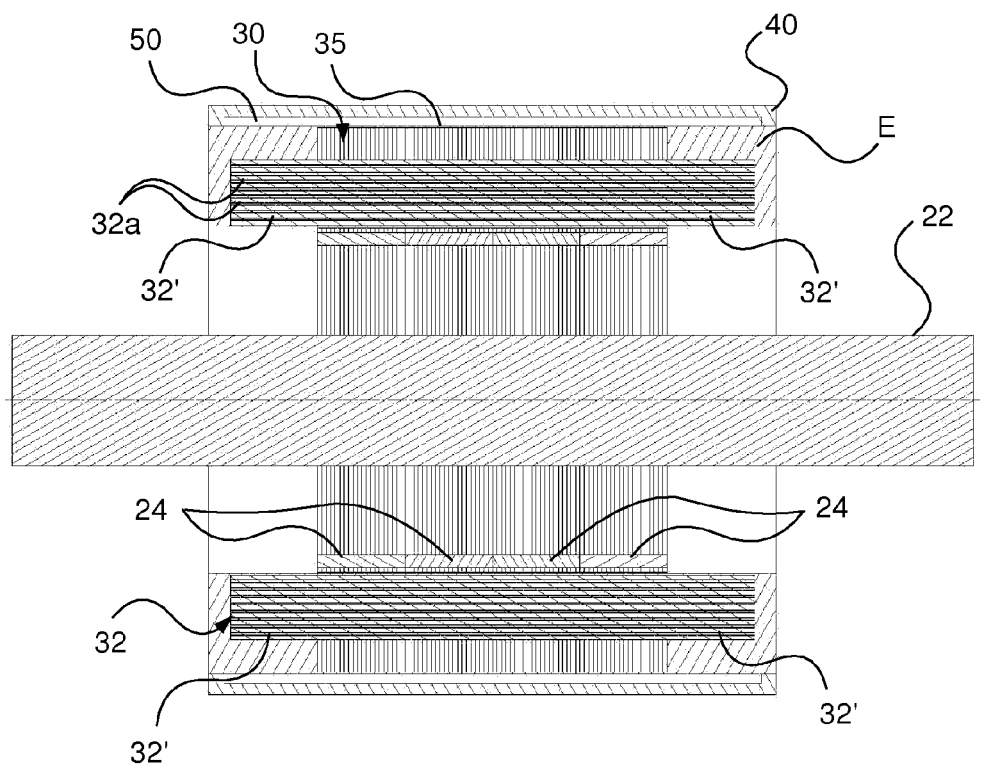
FIGS. 3a and 3b schematically show an axial and a radial cross sectional view respectively of an electric motor according to an embodiment of the present invention.
Figure 3B:
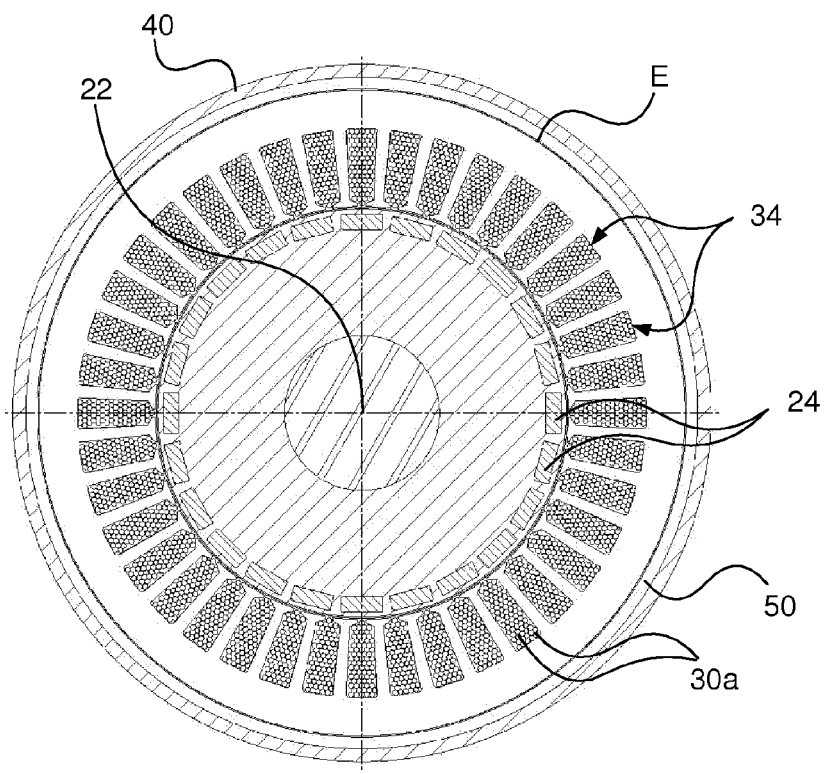

FIG. 2 schematically shows a side view of an axial cross section of an electric motor 10 and FIGS. 3a and 3b an axial and a radial cross sectional view respectively of an electric motor according to an embodiment of the present invention.

The electric motor 10 comprises a rotor 20 and a stator 30, said rotor being connected to a drive shaft 22 and arranged to rotate said drive shaft 22. The rotor shaft 22 is arranged to run concentrically relative to the rotor, wherein the rotor is arranged to surround the rotor shaft 22. The rotor 20 is according to a variant built up by stacked rotor plates 20a. The rotor 20 comprises magnets 24 being peripherally arranged at the rotor 20.

The stator 30 is arranged to surround the rotor 20, wherein the rotor shaft 22 and consequently the rotor 20 are concentrically arranged relative to the stator 30. The external surface of the rotor 20 is arranged adjacent to and separated from the internal surface of the stator 30. The stator 30 is according to a variant built up by stacked stator plates 30a. The stator 30 comprises a stator winding 32 comprising a set of electrically conductive wires 32a/conductors 32a, preferably copper wires, through which a current is arranged to be conducted for driving of the electric motor 10. Said conductors 10 may be of different thickness. Said stator winding 32 is arranged to run axially such that the winding adjoins adjacently to the rotor. The stator winding 32 is arranged to axially project form end portions of the stator 30, turn outside the end portions and be re-introduced through the end portion, wherein said projecting portion 32' of the stator winding 32 forms a so called coil end 32'.

Copper wires 32a of the winding 32 are according to a variant arranged to run axially in compartments/recesses 34 of the stator plates 30a and conducted out from end portions of the stator 30 and back into another compartment/recess 34 of the stator plates 30a. Said electrically conducting wires/conductors 32a may be of different shape for different filling of compartments/recesses.

The stator 30 is embedded in an adhesively liquid tight, heat conducting and heat sustainable thermosetting plastic, i.e. thermoset E, which preferably is constituted by epoxy E. Hereby the stator 30 is externally cased with said themoset E. Hereby the jacket surface 35, i.e. the so called stator back 35 of the stator, of the stator cased with said thermoset E such that a thermoset cased jacket surface 35 of the stator is formed. The stator winding 32 of the stator 30 is according to the present invention arranged to run along and axially projecting from and turn outside of said jacket surface 35 of the stator 30. The stator 30 including the respective projecting portion 32' of the stator winding 32, i.e. the respective coil end 32' is consequently according to the present invention embedded with said thermoset E.

A housing 40 or casing 40 is arranged in connection to the electric motor 10 to surround the electric motor 10 comprising the stator 30 of the electric motor. The housing 40 is arranged to run separated from the jacket surface of the stator along a substantial part of the thermoset cased jacket surface 35 of the stator for forming of said cooling channel 50 between the housing and said jacket surface 35.

The housing is further arranged to run outside of said jacket surface 35 in axial direction for forming of additional portions of said cooling channel 50. Said cooling channel 50 is thus formed also between the housing 40 and the respective thus projecting portion 32' of the stator winding 32. The cooling channel 50 consequently has a portion running in connection to the respective, with thermoset embedded, projecting portion 32'/coil end 32' of the stator winding, wherein cooling by means of the liquid medium is effected directly towards the coil ends 32' embedded in thermoset, which results in efficient cooling of the coil ends embedded in thermoset being facilitated.

The housing is according to this embodiment arranged to run separated from the jacket surface 35 along substantially the entire thermoset cased jacket surface 35 of the stator 30 forming said cooling channel 50. The housing is consequently arranged such that a cooling channel 50 is formed between the housing 40 and the thermoset cased stator 30 such that a cooling medium streaming in the cooling channel 50 will be in direct contact with the thermoset cased jacket surface 35 of the stator 30, i.e. comes in direct contact with the thermoset E.

Due to the fact that the stator 30 is cased with a liquid tight, heat conducting thermoset, water may advantageously be used as a liquid cooling medium, which facilitates efficient cooling.

The housing 40 is sealingly connected to said thermoset by means of sealing means 60 at the respective end area of the stator 30. The sealing means 60 is according to a variant constituted by seals, said seals according to a variant being constituted by O-ring. The sealing means 60 is according to a variant constituted by an adhesive material with sealing properties. The sealing means 60 is according to a variant constituted by fitting means intended to attend to that the surfaces between the stator embedded in epoxy and the housing has a certain surface fineness and/or form correctness. The fitting means comprises a machining arranged in the surface of the epoxy where the housing is intended to be arranged. Hereby sealing means in the shape of an O-ring is arranged in connection to said machining in order to ensure sealing, wherein the O-ring is arranged to be clamped and to seal between the surface of the stator and the surface of the housing. The thermoset E is applied to the stator 30 and is allowed to cure wherein the thermoset E adheres to the stator 30 such that the external surface of the stator 30 is cased with said thermoset E. After the thermoset E has solidified the housing 40 is applied such that said cooling channel 50 is formed. As a result of the housing 40 being applied afterwards and separately surrounded along the major part of the thermoset jacket surface 35 of the stator 30 the housing 40 may be formed differently depending on application, e.g. shape of the outer side of the housing. Hereby modularity is also obtained, wherein the same electric motor may be used for many applications where only the housing is varied for a new product.

Further a so called frameless electric motor may be produced by a manufacturer of electric motor while the actual housing may be produced and adapted to separately run along a substantial part of the thermoset jacket surface, which reduces the cost for production of the vehicle.

According to an embodiment said liquid cooling medium is arranged to stream essentially axially in said cooling channel via at least one inlet (not shown).

Figure 4:
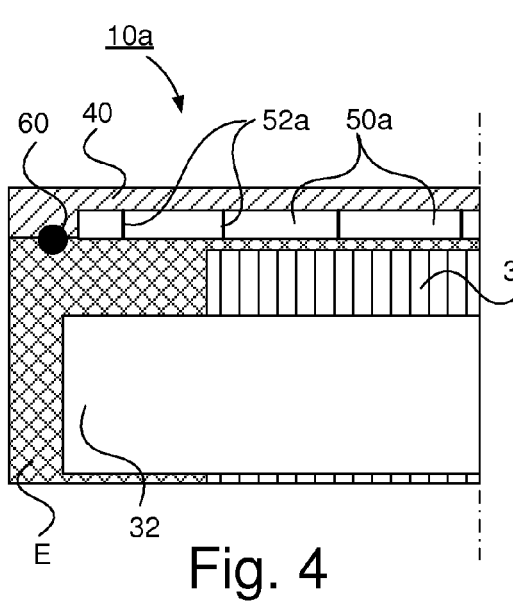
FIG. 4 schematically shows a side view of a cross section of a part of an electric motor according to an embodiment of the present invention.

FIG. 4 schematically shows a side view of a cross section of a part of an electric motor 10a according to an embodiment of the present invention. This embodiment differs from the electric motor according to the embodiment in FIG. 2 and FIG. 3a-b in that radial support elements 52a are arranged to run circumferentially between the housing and the themoset cased stator 30 forming cooling channel portions 50a of said cooling channel extending circumferentially.

Figure 5:
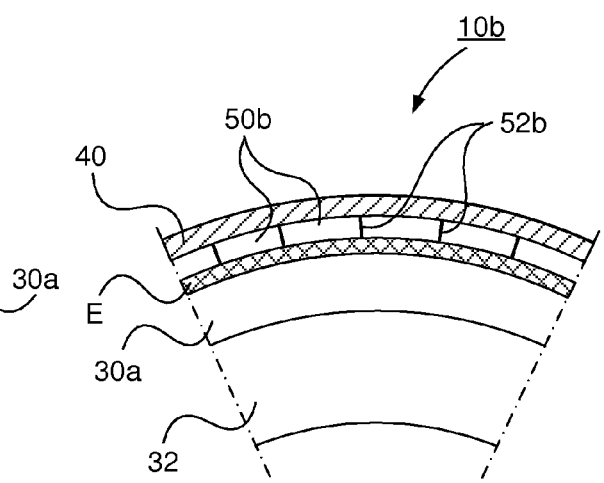
FIG. 5 schematically shows a view in the axial direction of distribution of a part of an electric motor according to an embodiment of the present invention.

FIG. 5 schematically shows a cross sectional view in the axial direction of distribution of a part of an electric motor 10b according to an embodiment of the present invention. This embodiment differs from the electric motor according to FIG. 2 and FIG. 3a-b in that axial support elements 52b are arranged to run axially between the housing and the thermoset stator 30 forming axial cooling channel portions 50b of said cooling channel 50. Hereby, according to an embodiment, the cooling medium could stream in an axially running cooling channel portion 50b and turn at one end of the electric motor and be conducted into another axially running cooling channel portion 50b and stream against the stream of the cooling medium in the earlier cooling channel portion.

According to an embodiment said liquid medium is arranged to stream essentially circumferentially in said cooling channel via at least one inlet.

The cooling channel 50 according to the present invention has an extension in radial direction being adapted among others to cooling needs, size of electric motor, desired streaming velocity of the cooling medium, temperature of the cooling medium etc. The cooling channel may have any desired configuration comprising any suitable form on channel portions.

With housing herein is intended an element surrounding the electric motor, where the housing may be of any suitable material and where the term housing comprises the terms casing and covering.

The housing 40 is according to a variant arranged to support the stator 30. According to a variant the stator 30 is arranged to be supported by means of other unit of e.g. a vehicle and consequently fixedly arranged separated from the housing 40, but sealingly connected to the housing 40.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A device for cooling of an electric motor comprising a stator with a jacket surface, the device comprising:
    a thermoset layer made of a heat conducting thermoset, the thermoset layer covering the jacket surface of the stator, which is an outer surface of the stator,
    a housing arranged to surround the stator and the thermoset layer,
    a cooling channel in which a liquid cooling medium is configured to stream for cooling of the electric motor, the cooling channel as a whole having a shape of a cylinder extending in a longitudinal direction of the electric motor, and the cooling channel being only one cooling channel appearing in a sectional view of the cooling device cut in the longitudinal direction,
    wherein the housing is arranged to run separated from the thermoset layer covering the stator along a main part of the jacket surface of the stator for forming of said cooling channel between the housing and the thermoset layer,
    wherein the stator is attached to a stator winding, and the stator winding of the stator is arranged to run along and axially project from the stator and turn outside of said stator,
    wherein the stator including the projecting stator winding is embedded with said thermoset layer,
    wherein said cooling channel is formed between the housing and the thus projecting stator winding,
    wherein the channel has a first end and the thermoset layer has a first end on a side of the device in the longitudinal direction, and the channel has a second end and the thermoset layer has a second end on the other side of the device in the longitudinal direction, the first end of the thermoset layer extending beyond the first end of the cooling channel, and the second end of the thermoset layer extending beyond the second end of the cooling channel, wherein the housing is sealingly connected to said thermoset layer by a sealing member at a portion between the first end of the cooling channel and the first end of the thermoset layer and a portion between the second end of the cooling channel and the second end of the thermoset layer, and wherein said cooling channel is enclosed in the housing in the longitudinal direction so that both ends of the cooling channel in the longitudinal direction are covered by the housing.

2. A device according to claim 1, wherein said thermoset is constituted by epoxy.

3. A device according to claim 1, wherein said liquid cooling medium is constituted by water.

4. A device according to claim 1, wherein said liquid cooling medium is arranged to stream essentially axially in said cooling channel.

5. A device according to claim 4, comprising support elements arranged to run axially between the housing and the thermoset layer forming axial cooling channel portions of said cooing channel.

6. A device according to claim 1, wherein said liquid medium is arranged to stream essentially circumferentially in said cooling channel.

7. A device according to claim 6, comprising support elements arranged to run circumferentially between the housing and the thermoset layer forming cooling channel portions of said cooling channel extending circumferentially.

8. An electric motor comprising a cooling device according to claim 1.

9. A motor vehicle comprising at least one electric motor according to claim 8.

* * * * *